Jan. 9, 1940.  A. H. SHOEMAKER  2,186,178
PNEUMATIC TIRE
Filed Feb. 11, 1937   2 Sheets-Sheet 1

INVENTOR.
Alvin H. Shoemaker
BY Fred C. Matheny
ATTORNEY

Jan. 9, 1940.   A. H. SHOEMAKER   2,186,178
PNEUMATIC TIRE
Filed Feb. 11, 1937   2 Sheets—Sheet 2

INVENTOR.
Alvin H. Shoemaker
BY Fred C. Matheny
ATTORNEY

Patented Jan. 9, 1940

2,186,178

UNITED STATES PATENT OFFICE 2,186,178

PNEUMATIC TIRE

Alvin H. Shoemaker, Seattle, Wash., assignor of one-half to Jacob George Smith, Seattle, Wash.

Application February 11, 1937, Serial No. 125,183

7 Claims. (Cl. 152—362)

This invention relates to pneumatic tires and the general object of this invention is to increase the stability of tires of this nature and to render the same resistant to side step, side sway, side deflection and shimmy.

Another object is to provide a pneumatic tire having in the side walls of the tire and at a distance outwardly from the bead portions thereof, two secondary bead rings around which certain plys of reinforcing material are passed, said secondary bead rings serving to stabilize the tire and resist side sway, side step, side deflection and shimmy without materially detracting from the pliability and elasticity of the tire.

Another object is to provide a tire bead construction which is adapted to provide greater stability for the tire when used in connection with substantially any ordinary type of tire reinforcing and which is particularly well adapted for use in connection with radial cord tire reinforcing to give stability to the tire.

Another object of the invention is to provide a pneumatic tire of this nature in which the reinforcing plys are very firmly connected with the bead rings by passing said plys around the bead rings, and doubling the edge portions of said plys back so that said edge portions extend outwardly in the side walls and add to the reinforcing in the side walls.

Tires in which the reinforcing cords are positioned radially of the tire and extend substantially directly around the tire from a bead ring on one side to a bead ring on the other side of the tire are hereinafter referred to as radial cord tires. These radial cord tires are very flexible and pliable and easy riding and run very freely on the road. However they have been found to be unstable on the road and subject to side step, side sway, side deflection and shimmy. The present invention overcomes the objectionable features above mentioned when embodied in a radial cord tire. However it is to be understood that said invention is not to be limited to use in connection with radial cord tires.

Another object is to provide a pneumatic tire which employs chiefly radial cord reinforcing and retains the desirable flexibility and pliability inherent in radial cord tires and at the same time is possessed of great stability, is substantially free from side step, side sway, side deflection and shimmy and is adapted to fit onto a rim of ordinary conventional type.

A further object is to provide a tire having a non-skid tread design comprising a plurality of annular ribs extending circumferentially and continuously around the tire in slightly spaced relation, said ribs being inclined outwardly in opposite directions from the medial plane of the tire in such a manner as to help to stabilizing the tire and to provide an efficient non-skid for the same.

In the accompanying drawings

Like reference numerals designate like parts throughout the several views.

Figure 1:
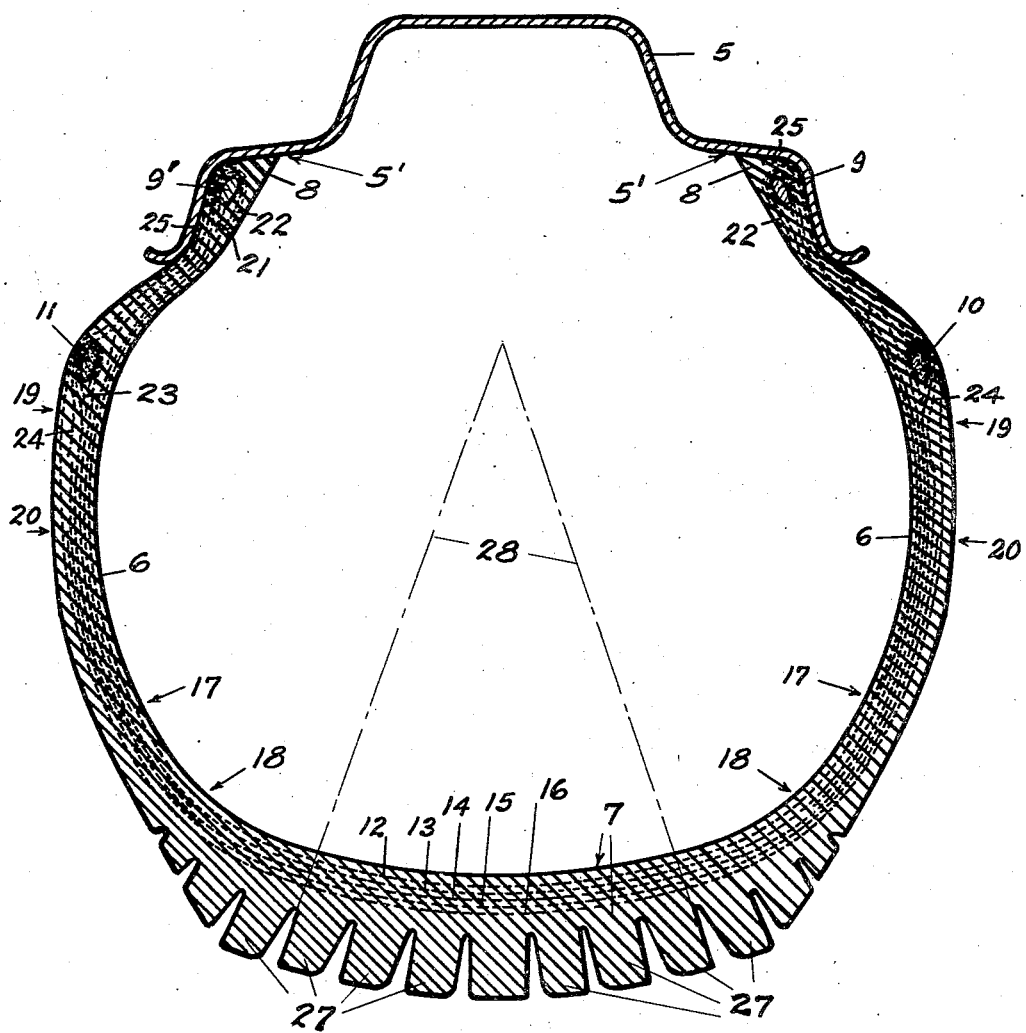
Fig. 1 is a view in cross section of a pneumatic tire constructed in accordance with this invention.

In accordance with this invention I provide a tire comprising side walls 6, a tread portion 7 and bead portions 8. Embedded within the bead portions 8 are endless bead rings 9 and 9' of a form common to pneumatic tires and hereinafter termed main bead rings. Other endless bead rings 10 and 11 are embedded within the sidewalls of the tire at a distance outwardly from the bead portions 8 and bead rings 9 and 9'. The bead portions 8 of the tire are supported by a drop center rim 5 of well known conventional type. The secondary bead rings 10 and 11 are positioned outwardly in spaced relation from the side flanges of the rim 5, and are spaced apart transversely farther than the main bead rings 9 and 9', said secondary bead rings being in substantially the widest part of the tire. The secondary bead rings 10 and 11 are formed of strong, tough, pliable material which will not crystalize and is capable of being bent and flexed. These secondary bead rings are preferably designed and arranged to carry as much tension or stress as, or more tension or stress than, the primary bead rings, under service conditions. One material suitable for the construction of these secondary bead rings is strong tightly twisted cotton which provides a relatively hard and solid bead ring which is relatively strong longitudinally. It is also practical to use fine braided metal wire for these secondary beads.

Figure 2:
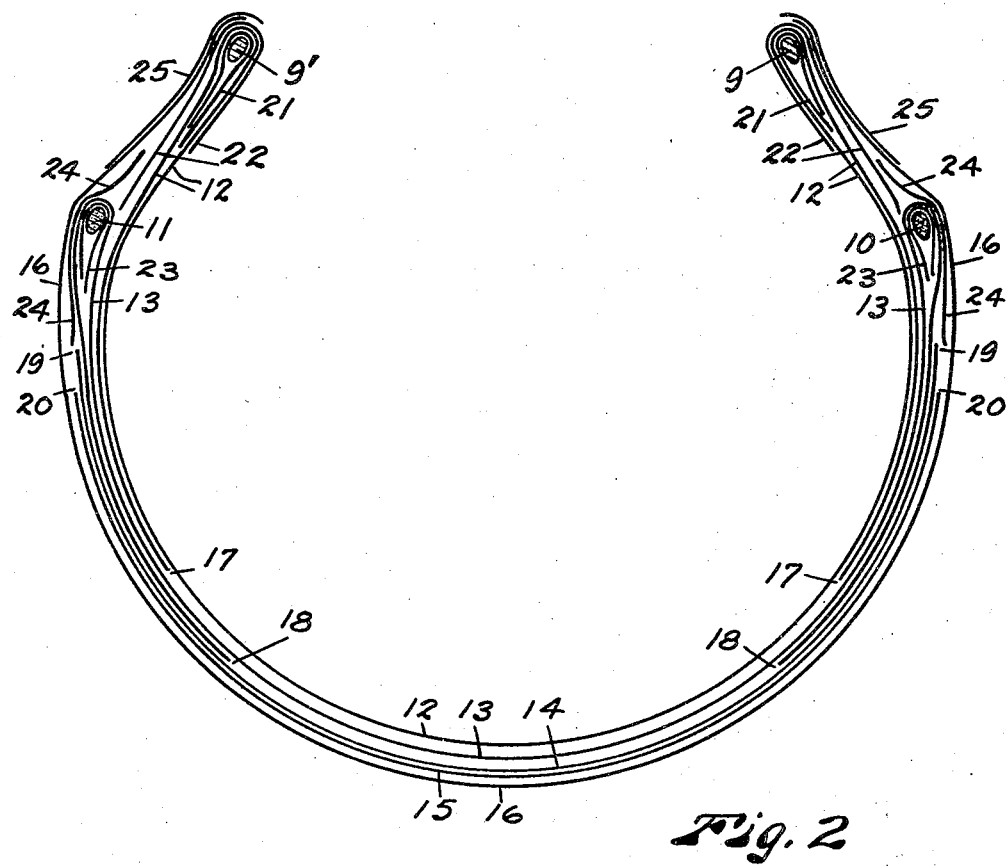
Fig. 2 is a diagrammatic view illustrating the arrangement of the reinforcing plys and beads in said tire, the several reinforcing plys being shown by single lines.

One preferred arrangement of reinforcing used in this tire is diagrammatically shown in Fig. 2. Preferably this reinforcing comprises an inner ply 12 embedded within the tire near the inner peripheral wall thereof and passing around each bead ring 9 and 9' and extending back within the side wall of the tire substantially to the locations 17. The usual flip 21 is preferably provided around each bead ring 9 and 9' between the bead ring and the reinforcing 12. Also a chafing strip 22 is preferably embedded in the bead portion of the tire so as to extend around each bead ring 9 and 9' just outside of the reinforcing 12. One end of each chafing strip 22 preferably extends outwardly to substantially the location of the adjacent secondary bead ring 10 or 11.

A second ply of reinforcing 13 is embedded within the tire just outwardly from the reinforcing 12. This ply of reinforcing 13 extends continuously between the beads 10 and 11 and is doubled about said bead rings 10 and 11 and extends outwardly in the tire to substantially the location 18. A flip 23 and a chafing strip 24 both of conventional form are provided respectively just inside and just outside of each doubled portion of the reinforcing ply 13 where said reinforcing ply passes around the bead rings 10 and 11. It will be noted that each ply 12 and 13 of reinforcing material passes around a bead ring at each side of the tire and extends back substantially through the side wall portion of the tire. This leaves each of said plys single in the tread portion but doubles each of said plys in the side wall of the tire and anchors each of said plys very firmly to the respective bead rings.

Preferably two plies 14 and 15 of highly elastic non-radial cord reinforcing material are embedded in the tire just outwardly from the radial cord reinforcing ply 13. These plies 14 and 15 do not extend entirely to the bead rings and preferably terminate at substantially the locations 19 and 20. These plies 14 and 15 of non-radial cord reinforcing are not anchored to any bead rings at their edges and are made of highly elastic cords. They do not hamper and restrict the desired freedom of action of the reinforcing plys 12 and 13 to objectionable extent but they lend stability to the tire and help to prevent side sway, side deflection, side step and shimmy.

Preferably an outer ply of reinforcing 16 is embedded in the tire just outwardly from the ply 15. This ply 16 preferably extends entirely around the tire and terminates at the location of the beads 9 and 9'. Preferably a chafing strip 25 is provided just outwardly of the ply 16 at the location where the bead portion of the tire engages the rim.

In a radial cord tire the two inner plys 12 and 13 and the outer ply 16 are preferably of radial cord constructions.

The tire is preferably built so that when it is finished and inflated as great or greater tension due to air pressure will be carried by the secondary bead rings and reinforcing connected thereto as will be carried by the main bead rings and their reinforcing.

From the above description it will be seen that this tire embodies two main bead rings positioned in the bead portion of the tire in the usual manner, two secondary bead rings positioned in the side walls of the tire outwardly from the main bead rings and spread apart farther than the main bead rings, plys of reinforcing extending around the tire and anchored respectively to the main bead rings and the secondary bead rings and stabilizing reinforcing embedded in the tire outwardly from said other reinforcing plys and terminating short of the bead rings.

The tire is completely lined with air tight rubber lining and this rubber extends around onto the base of the bead portions so that when said bead portions are crowded out and caused to bind tightly on the inclined portions 5' of the rim an air seal will be formed and no inner tube will be necessary. The secondary bead rings 10 and 11 check the traction wave which would otherwise be transmitted to the bead portions 8 thus preventing movement of said bead portions 8 and making it possible to maintain the air seal between said bead portions and the rim.

The secondary bead rings 10 and 11 are positioned radially outward from the main bead rings 9 and 9' and are spaced a greater distance apart than the main bead rings. For this reason, if a force is exerted tending to move either one of the secondary bead rings transversely toward the medial plane of the tire such movement of the secondary bead ring will be resisted by a compression in those portions of the tire between the secondary bead rings and the main bead rings and the result will be a stabilizing of the tire helping to prevent side sway and shimmy. Also the secondary bead rings form a very widely spread apart anchor means for some of the reinforcing plys thus providing a wider base of anchorage and holding said plys more firmly against side sway and shimmy than they would be held if they were anchored to bead rings positioned closer together.

These secondary bead rings also help to absorb a traction wave which runs through the tire when in use and for this reason help to prevent movement of the bead portions 8 on the rim and thereby make it possible to maintain an air seal between the bead portions 8 and the rim so that no inner tube is needed.

The tread portion 7 of the tire is provided with an external non-skid portion comprising a plurality of circular ribs 27 extending circumferentially and continuously around the tire in side by side slightly spaced apart relation, the ribs on each side of the medial plane of the tire being inclined outwardly as shown in Fig. 1, so that planes parallel to the sides of said ribs, when projected inwardly toward the rim will intersect at a point between the tread and bead portion of the tire, as illustrated by dot and dash lines 28. These tread ribs being inclined outwardly on both sides of the center of the tire will always maintain their predetermined inclined position under load and the set of ribs on one side of the center will always be inclined in the proper direction to resist by a direct thrust any side deflection, side sway or side step action. In this way these inclined annular ribs have a bracing and stabilizing effect which will always tend to cause the tire to run true.

The employment of the secondary beads hereinbefore described in tires having ordinary conventional reinforcing will add stability to these tires without detracting from the easy riding qualities of the tires. The employment of these secondary beads in tires employing radial cord construction as reinforcing makes its possible to construct a tire having greater elasticity, pliability and flexibility than the ordinary tire and at the same time to provide a tire having great stability against all forms of side deflection and capable of use under heavy loads and at high speeds.

The foregoing description and accompanying drawings clearly disclose what I now regard as a preferred embodiment of my invention but it will be understood that this disclosure is merely illustrative and that such changes may be made in the tire as are within the scope and spirit of the following claims.

I claim:

1. In a pneumatic tire, a tire member having a tread portion, two side wall portions and two bead portions; substantially non-elastic bead rings embedded in said bead portions and extending continuously around the tire in said bead portions; other substantially non-elastic bead rings of larger diameter than said first mentioned bead rings embedded in said side wall portions outwardly from said bead portions in coaxial relation to said first named bead rings; and reinforcing plys embedded in said tire and connected with said bead rings.

2. In a pneumatic tire, a tire member having a tread portion, two side wall portions and two bead portions; two substantially non-elastic main bead rings embedded in said two bead portions; two substantially non-elastic secondary bead rings embedded in said two side wall portions outwardly from said two main bead rings and spaced apart farther than said two main bead rings; a reinforcing ply embedded in said tire and anchored to said two main bead rings; and another reinforcing ply embedded in said tire and anchored to said two secondary bead rings.

3. In a pneumatic tire, a tire member having a tread portion, two side wall portions and two bead portions; two substantially non-elastic main bead rings embedded in said two bead portions; two substantially non-elastic secondary bead rings embedded in said two side wall portions radially outward from said main bead rings and spaced apart farther than said two main bead rings in transverse directions; a continuous ply of radial cord reinforcing material embedded in said tire and anchored to said two main bead rings; and another continuous ply of radial cord reinforcing material embedded in said tire and anchored to said two secondary bead rings.

4. In a pneumatic tire, a tire member having a tread portion, two side wall portions and two bead portions; two substantially non-elastic main bead rings embedded in said two bead portions; two substantially non-elastic secondary bead rings embedded in said two side wall portions radially outward from said main bead rings and spaced apart transversely farther than said two main bead rings; a continuous ply of radial cord reinforcing material embedded in said tire near the inner peripheral wall thereof and anchored to said two main bead rings; and another continuous ply of radial cord reinforcing material embedded in said tire outside of said first mentioned ply and anchored to said two secondary bead rings.

5. In a pneumatic tire, a tire member having a tread portion, two side wall portions and two bead portions; two substantially non-elastic main bead rings embedded in said two bead portions; two substantially non-elastic secondary bead rings embedded in said two side wall portions radially outward from said main bead rings and spaced apart transversely farther than said two main bead rings; a continuous ply of radial cord reinforcing material embedded in said tire member and anchored to said two main bead rings; another continuous ply of radial cord reinforcing material embedded in said tire member and anchored to said two secondary bead rings; and other plys of reinforcing material embedded in said tire externally of said aforementioned plys and terminating free of said bead rings.

6. In a pneumatic tire, a tire member having a tread portion, two side wall portions and two bead portions; two substantially non-elastic main bead rings embedded in said two bead portions; two substantially non-elastic secondary bead rings embedded in said two side wall portions radially outwardly from said main bead rings and spaced apart transversely farther than said two main bead rings; a continuous ply of radial cord reinforcing material embedded in said tire member and anchored to said two main bead rings; another continuous ply of radial cord reinforcing material embedded in said tire member and anchored to said two secondary bead rings; highly elastic non-radial cord reinforcing material embedded in said tire outwardly from said above mentioned plys and extending throughout the tread portion and into the side wall portion of said tire; and an outer ply of radial cord reinforcing material embedded in said tire externally of said other reinforcing material and extending continuously around said tire from one tire bead portion to the other tire bead portion.

7. In a pneumatic tire, a tire member having a tread portion, two side wall portions and two bead portions; two substantially non-elastic main bead rings embedded in said two bead portions; two substantially non-elastic secondary bead rings embedded in said two side wall portions radially outward from said main bead rings and spaced apart transversely farther than said two main bead rings; a continuous ply of radial cord reinforcing material embedded in said tire near the inner peripheral wall thereof extending around said two main bead rings and thence extending back in relatively overlapped relation substantially throughout said side walls; and another continuous ply of radial cord reinforcing material embedded in said tire member outwardly from said first mentioned ply extending around said two secondary bead rings and thence extending back in relatively overlapped relation substantially throughout said side walls thereby providing secure anchorage of the reinforcing material about the respective bead rings and providing additional reinforcing in the side walls of the tire.

ALVIN H. SHOEMAKER.